US012737401B2

(12) United States Patent
Zhu et al.

(10) Patent No.: US 12,737,401 B2
(45) Date of Patent: Sep. 15, 2026

(54) METHOD OF DETECTING TEXT, TRAINING METHOD, APPARATUS, DEVICE, MEDIUM, AND PROGRAM PRODUCT

(71) Applicant: BAIDU ONLINE NETWORK TECHNOLOGY (BEIJING) CO., LTD., Beijing (CN)

(72) Inventors: Dongsheng Zhu, Beijing (CN); Hongyu Li, Beijing (CN); Qian Lei, Beijing (CN); Guoliang Xing, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 206 days.

(21) Appl. No.: 18/886,893

(22) Filed: Sep. 16, 2024

(65) Prior Publication Data

US 2025/0036671 A1 Jan. 30, 2025

(30) Foreign Application Priority Data

Mar. 22, 2024 (CN) ......................... 202410339038.5

(51) Int. Cl.
*G06F 16/334* (2025.01)
*G06F 40/284* (2020.01)
(Continued)

(52) U.S. Cl.
CPC ........ *G06F 16/3344* (2019.01); *G06F 40/284* (2020.01); *G06N 3/08* (2013.01); *G06N 5/041* (2013.01); *G06N 20/00* (2019.01)

(58) Field of Classification Search
CPC .......... G06N 20/00; G06N 5/041; G06N 3/08; G06F 16/3344; G06F 40/284
See application file for complete search history.

(56) References Cited

U.S. PATENT DOCUMENTS 8,868,472 B1 * 10/2014 Lin .......................... G06N 5/02 706/12
10,453,454 B2 * 10/2019 Homma ............. G06F 16/3329
(Continued)

FOREIGN PATENT DOCUMENTS

| | | |
|---|---|---|
| CN | 113656570 | 11/2021 |
| CN | 114357138 | 4/2022 |

(Continued)

OTHER PUBLICATIONS

Action issued in corresponding Japanese Patent Application No. 2024-154793, dated Jun. 30, 2025.
(Continued)

*Primary Examiner* — Samuel G Neway
(74) *Attorney, Agent, or Firm* — Pillsbury Winthrop Shaw Pittman, LLP

(57) ABSTRACT

A method of detecting a text, a training method, a device, and a medium are provided, which relate to a field of artificial intelligence, in particular to large language models, deep learning, text processing, etc. The training method includes: when a confidence level of a first sample detection result output by a first model is less than a threshold, processing a sample text pair and a sample label by using an initial model to obtain a second sample detection result, the second sample detection result includes a discrimination result configured to characterize a response matching degree between a sample answer text and a sample query text included in the sample text pair, and a discrimination reason; obtaining a first loss value according to the second sample detection result and the sample label; and adjusting a model parameter of the initial model based on the first loss value.

20 Claims, 8 Drawing Sheets

(51) Int. Cl.

| | |
|---|---|
| ***G06N 3/08*** | (2023.01) |
| ***G06N 5/04*** | (2023.01) |
| ***G06N 20/00*** | (2019.01) |

(56) References Cited

U.S. PATENT DOCUMENTS

| | | | | |
|---|---|---|---|---|
| 2019/0370607 | A1* | 12/2019 | Lecue | G06N 20/00 |
| 2021/0157857 | A1* | 5/2021 | Nogueira Dos Santos | G06N 20/00 |
| 2022/0051134 | A1* | 2/2022 | Nizar | G06F 18/2113 |
| 2023/0315999 | A1* | 10/2023 | Mohammed | G06F 16/345 704/9 |
| 2023/0342398 | A1 | 10/2023 | Vargaftik et al. | |
| 2023/0342670 | A1* | 10/2023 | Leary | G06F 16/953 |
| 2025/0036671 | A1* | 1/2025 | Zhu | G06F 16/3329 |

FOREIGN PATENT DOCUMENTS

| | | |
|---|---|---|
| CN | 114547270 | 5/2022 |
| CN | 116483979 | 7/2023 |
| CN | 117009490 | 11/2023 |
| CN | 117688424 | 3/2024 |
| JP | 20230083972 | 6/2023 |

OTHER PUBLICATIONS

A. Mao et al., "Cross-Entropy Loss Functions: Theoretical Analysis and Applications", Proceedings of the 40th International Conference on Machine Learning, pp. 1-26, arXiv:2304.07288v2 at arxiv.org (accessed Jun. 20, 2023).

European Search Report issued in corresponding European Patent Application No. 24201078.3, dated Feb. 10, 2025.

Office Action issued in corresponding Chinese Patent Application No. 202410339038.5, dated Jan. 22, 2025.

* cited by examiner

METHOD OF DETECTING TEXT, TRAINING METHOD, APPARATUS, DEVICE, MEDIUM, AND PROGRAM PRODUCT

This application claims the benefit of Chinese Patent Application No. 202410339038.5 filed on Mar. 22, 2024, the whole disclosure of which is incorporated herein by reference.

TECHNICAL FIELD

The present disclosure relates to a technical field of artificial intelligence, in particular to large language models, deep learning, text processing, and the like, and specifically relates to a method of detecting a text, a training method, a device, and a medium.

BACKGROUND

With the popularization of Internet technology, a user may post a query over the Internet in order to get an answer from other users to the query.

Due to the fact that the fields of queries are numerous, phenomena such as "wrong answers" or "answers that are not related to the query" often occur. Therefore, there is an urgent need for a method that may accurately detect a matching degree between an answer and a query to improve user experience.

SUMMARY

The present disclosure provides a method of detecting a text, a training method, a device, and a medium.

According to an aspect of the present disclosure, there is provided a method of training a model, including: processing, in response to a confidence level of a first sample detection result being less than a predetermined threshold, a sample text pair and a sample label by using an initial model to obtain a second sample detection result, wherein the confidence level of the first sample detection result is obtained by detecting the sample text pair using a first model, the sample text pair includes a sample query text and a sample answer text corresponding to the sample query text, the second sample detection result includes a discrimination result configured to characterize a response matching degree between the sample answer text and the sample query text, and a discrimination reason corresponding to the discrimination result, the sample label includes a discrimination result label and a discrimination reason label, and a type of the initial model is different from a type of the first model; obtaining a first loss value according to the second sample detection result and the sample label based on a first loss function; and adjusting a model parameter of the initial model based on the first loss value to obtain a trained target model.

According to another aspect of the present disclosure, there is provided a method of detecting a text, including: detecting a plurality of text pairs to be detected by using a first model to obtain a first detection result and a confidence level corresponding to the first detection result, wherein the first model is a discriminative model, and the plurality of text pairs to be detected include a plurality of query texts and a plurality of answer texts corresponding to the plurality of query texts; determining a target text pair to be detected from the plurality of text pairs to be detected based on the confidence level, wherein a confidence level of a detection result corresponding to the target text pair to be detected is less than a predetermined threshold; detecting the target text pair to be detected by using a second model to obtain a second detection result, wherein the second model is a trained target model obtained by the method according to any one of claims 1 to 4; and generating a target detection result according to the first detection result and the second detection result, wherein the target detection result characterizes a response matching degree between an answer text and a corresponding query text.

According to another aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, there is provided a non-transitory computer readable storage medium having computer instructions stored therein, wherein the computer instructions are configured to cause a computer to implement the method described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

In the scenario of determining the quality of text queries and answers, the fields related to query texts in the sample data are numerous. During the multi round training process of a discriminative model based on a large amount of sample data, it is easy to cause overfitting of the model.

When an input to-be-detected query and answer text pair slightly deviates from a sample data distribution, the model reasoning performance will fluctuate significantly, leading to a significant decrease in the accuracy of the output result of the model.

In addition, the detection of the quality of text queries and answers by the model in the related examples is based on surface features such as the language fluency of the answer text and the semantic correlation between queries and answers, and the lack of processing on deep features such as logical correlation between queries and answers also leads to low model accuracy.

Generative Large Language Models (LLMs) are natural language processing models with logical reasoning capabilities which are pre-trained using deep learning technology.

Therefore, embodiments of the present disclosure provide a method of training a model, which uses a discrimination result and a discrimination reason as labels to guide an initial model to perform detection by using deep features such as the logical correlation between the query text and the answer text, so as to improve the model accuracy, achieve accurate detection of sample text pairs that are difficult to detect for a first model, and obtain the quality detection results of query and answer text pairs with high confidence level.

Figure 1:
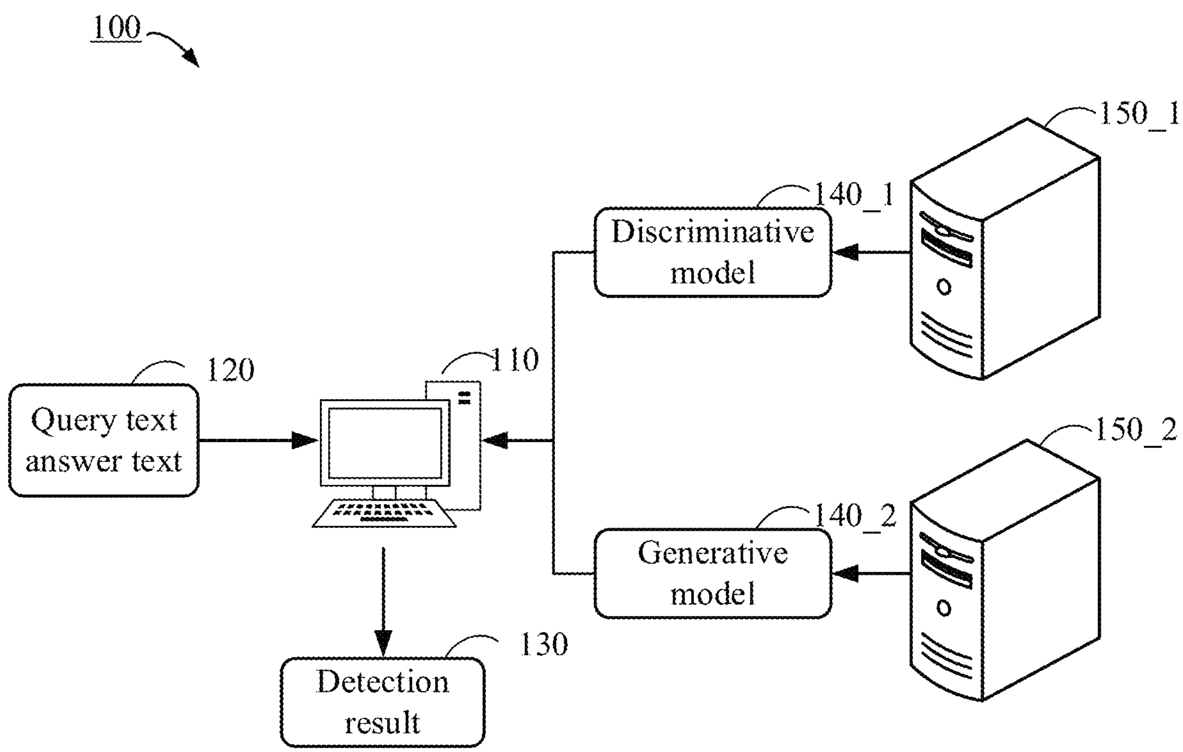
FIG. 1 schematically shows an exemplary system architecture to which a method and an apparatus of training a model or a method and an apparatus of detecting a text may be applied according to an embodiment of the present disclosure.

FIG. 1 schematically shows an exemplary system architecture to which a method and an apparatus of training a model or a method and an apparatus of detecting a text may be applied according to an embodiment of the present disclosure.

It should be noted that FIG. 1 is only an example of a system architecture that may be applied to embodiments of the present disclosure, in order to help those skilled in the art understand the technical content of the present disclosure. However, it does not mean that embodiments of the present disclosure may not be used for other devices, systems, environments, or scenarios. For example, in another embodiment, an exemplary system architecture to which a method and an apparatus of training a model may be applied may include a terminal device, but the terminal device may implement the method and the apparatus of training a model and the apparatus provided in embodiments of the present disclosure without interacting with a server.

As shown in FIG. 1, a system architecture 100 according to the embodiment may include a terminal device 110, a first server 150_1, and a second server 150_2. The terminal device 110 may be various electronic devices with processing functions, including but not limited to a smartphone, a tablet, a laptop, a desktop computer, a smart wearable device, and the like.

The first server 150_1 may be configured to perform a training method for a first model in the method of training a model provided in the embodiment of the present disclosure, and obtain a discriminative model 140_1. The second server 150_2 may be configured to perform a training method for a target model in the method of training a model provided in the embodiment of the present disclosure, and obtain a generative model 140_2.

The terminal device may load a trained discriminative model 140_1 and a trained generative model 140_2 to process query text and answer text 120 based on the loaded discriminative model 140_1 to obtain a preliminary detection result. The query text and answer text with a confidence level less than a predetermined threshold in the preliminary detection result may be processed using the generative model 140_2 to obtain a detection result 130.

It should be noted that the method of training a model or the method of detecting a text provided in the embodiments of the present disclosure may generally be executed by the terminal device 110. Correspondingly, the apparatus of training a model or the apparatus of detecting a text provided in the embodiments of the present disclosure may also be installed in the terminal device 110.

Alternatively, the method of training a model or the method of detecting a text provided in the embodiments of the present disclosure may generally be performed by the first server 150_1 and the second server 150_2. Correspondingly, the apparatus of training a model or the apparatus of detecting a text provided in the embodiments of the present disclosure may generally be arranged in the first server 150_1 and the second server 150_2. The method of training a model or the method of detecting a text provided in the embodiments of the present disclosure may also be performed by a server or server cluster that is different from the first server 150_1 and the second server 150_2 and may communicate with the terminal device 110 and/or the first server 150_1 and the second server 150_2. Correspondingly, the apparatus of training a model or the apparatus of detecting a text provided in the embodiments of the present disclosure may also be arranged in a server or server cluster that is different from the first server 150_1 and the second server 150_2 and may communicate with the terminal device 110 and/or the first server 150_1 and the second server 150_2.

It should be understood that the number of terminal devices and servers in FIG. 1 is merely illustrative. There may be any number of terminal devices and servers as desired for implementation.

In the technical solution of the present disclosure, the acquisition, storage, use, processing, transmission, provision, disclosure and application of user's personal information involved comply with provisions of relevant laws and regulations, and do not violate public order and good custom, and necessary confidentiality measures have been taken.

In the technical solution of the present disclosure, authorization or consent from the user is obtained before acquiring or collecting the user's personal information.

Figure 2:
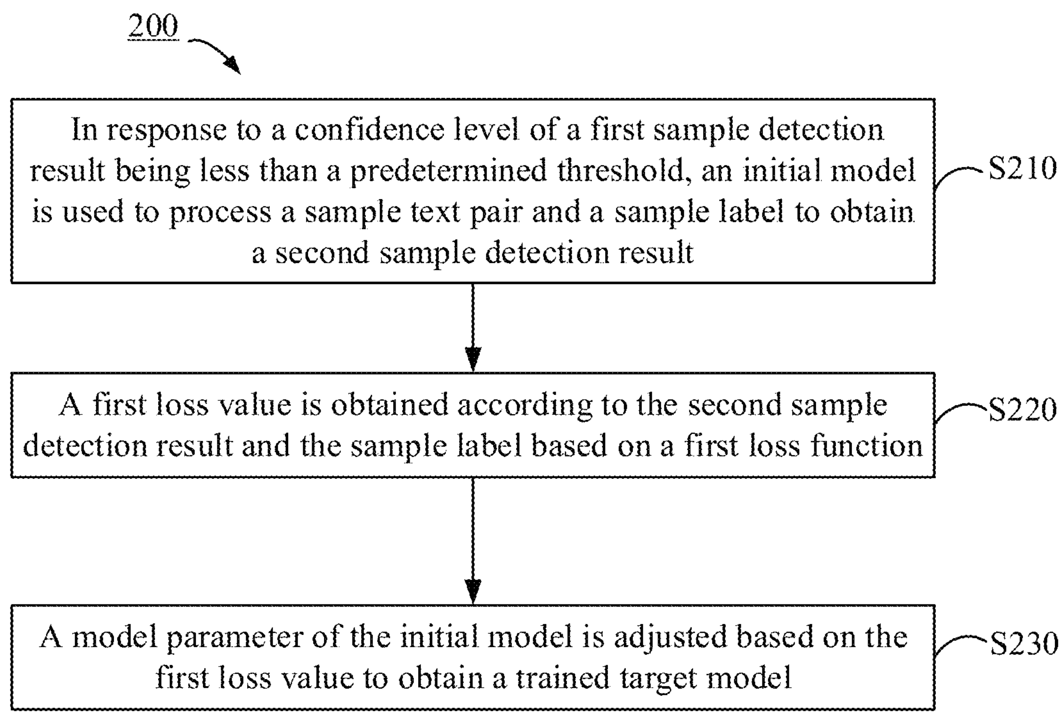
FIG. 2 schematically shows a flowchart of a method of training a model according to an embodiment of the present disclosure.

FIG. 2 schematically shows a flowchart of a method of training a model according to an embodiment of the present disclosure.

As shown in FIG. 2, the method 200 includes operation S210 to operation S230.

In operation S210, in response to a confidence level of a first sample detection result being less than a predetermined threshold, an initial model is used to process a sample text pair and a sample label to obtain a second sample detection result.

In operation S220, a first loss value is obtained according to the second sample detection result and the sample label based on a first loss function.

In operation S230, a model parameter of the initial model is adjusted based on the first loss value to obtain a trained target model.

According to an embodiment of the present disclosure, the type of the initial model is different from the type of the first model. The initial model may be a generative model, such as Large Model ERNIE, Large Language Model Meta AI (LlaMA), and GPT (Generative Pre-trained Transformer) model. The first model may be a discriminative model, such as a convolutional neural network model and Enhanced Language Representation with Informative Entities (ERNIE) model.

According to an embodiment of the present disclosure, the first model and the initial model may be trained in two stages. In the first stage, the first model may be trained in a supervised manner by using an initial sample text, such that a loss value between an output result of the first model and a manually labeled result label reaches a convergence condition, and the trained first model may be obtained. The convergence condition may be the maximum number of training iterations or a predetermined loss value, which is not specifically limited in the present disclosure.

After completing the first stage of training, the trained first model processes the initial sample text pair to obtain the first sample detection result. The first sample detection result may include a discrimination result corresponding to the initial sample text pair and a confidence level corresponding to the discrimination result. The confidence level corresponding to the discrimination result may characterize the difficulty of the first model in discriminating the initial sample text pair.

For example, the initial sample text pair may include a plurality of text pairs consisting of sample query text and sample answer text: $Q_1$-$A_1$, $Q_2$-$A_2$ . . . $Q_n$-$A_n$. The first model is used to process the initial sample text pair, and the first sample detection result may be: $Q_1$-$A_1$ (I, 95%), $Q_2$-$A_2$ (II, 55%) . . . $Q_n$-$A_n$ (III, 75%), where I may represent that answer text $A_1$ does not solve query text $Q_1$, II may represent that answer text $A_2$ partially solves query text $Q_2$, and III may represent that answer text $A_n$ perfectly solves query text $Q_n$. 95%, 55% and 75% respectively represent the confidence level of the first model in the corresponding detection results of the respective text pairs. The higher the confidence level, the lower the difficulty of the first model in discriminating the text pair, and the more accurate the detection result.

Therefore, by setting a predetermined threshold and based on the first sample detection result, sample text pairs with the confidence level less than the predetermined threshold may be filtered out for training the generative model in the second stage.

For example, the predetermined threshold may be 80%, and the sample text pairs selected based on the first sample detection result may include at least $Q_2$-$A_2$ (II, 55%) . . . $Q_n$-$A_n$ (III, 75%).

According to an embodiment of the present disclosure, before starting the training in the second stage, the manually labeled numerical discrimination result labels I-III corresponding to the selected sample text pairs may be converted into corresponding textual labels: <unresolved query>, <query partially solved>, and <query perfectly solved>, to meet the input requirements of the generative model.

In order to guide the initial model to use deep features such as logical correlation in the sample text pair for detection, the discrimination reason corresponding to the discrimination result label may be used as a label to train the generative model. Exemplarily, the discrimination reason label may be manually labeled based on the discrimination result label.

For example, for the sample text pair $Q_2$-$A_2$, the discrimination result label may be "query partially solved", and the discrimination reason label may be "$A_2$ only solves the first part of the query in $Q_2$, and does not solve the second part of the query".

According to an embodiment of the present disclosure, the initial model may be used to process the sample text pair and the sample label to obtain the second sample detection result. The second sample detection result may include a discrimination result configured to characterize a response matching degree between the sample answer text and the sample query text, and a discrimination reason corresponding to the discrimination result. For example, [query partially solved; reason: $A_2$ only solves the first part of the query in $Q_2$].

According to an embodiment of the present disclosure, the first loss value may be obtained according to the second sample detection result and the sample label based on the first loss function. The first loss function may be a cross entropy loss function, for example:

$$L1 = -\sum_{t=1}^{T} \log P(w_t \mid w_{<t}) \tag{1}$$

where $w_t$ represents the $t^{th}$ word, $w_{<t}$ represents the first t−1 words, and T represents the length of the text sequence obtained by adding the text-form discrimination result label and discrimination reason.

According to an embodiment of the present disclosure, the model parameter of the initial model may be adjusted based on the first loss value until the convergence condition is met, so as to obtain a trained target model. The convergence condition may be the maximum number of training iterations, the loss value reaching a predetermined threshold, or the loss value converging. The embodiments of the present disclosure do not have specific limitations on the convergence condition.

According to an embodiment of the present disclosure, the discrimination result and the discrimination reason are used as labels to guide the initial model to perform detection by using deep features such as the logical correlation between the query text and the answer text, so as to improve the model accuracy, achieve accurate detection of sample text pairs that are difficult to detect for the first model, and obtain the quality detection results of query and answer text pairs with high confidence level.

According to an embodiment of the present disclosure, the first model may be fine-tuned based on the sample text pair in the specific application scenario to improve the discrimination accuracy of the first model.

For example, the first model may be Enhanced Representation from kNowledge IntEgration (ERNIE) model, which is built based on the encoder of Transformer. In the pre-training phase, the pre-training tasks performed may include the Masked Language Modeling (MLM) task and the Next Sentence Prediction (NSP) task.

In an embodiment of the present disclosure, a branch for outputting confidence level may be added to an output layer of the ERNIE model to determine the difficulty of the ERNIE model in discriminating the input sample text pairs.

Then, the pre-trained model may be used to detect the sample text pair to generate the sample detection result and the confidence level of the sample detection result. A second loss value is obtained according to the sample detection result and the sample discrimination result label based on a second loss function. The model parameter of the pre-trained model is adjusted based on the second loss value to obtain the first model.

According to an embodiment of the present disclosure, a construction form of the sample text pair may be: <query text><delimiter><answer text>. The label of the sample discrimination result may be manually labeled.

According to an embodiment of the present disclosure, the second loss function may be a cross entropy loss function. For example:

$$L2 = -\sum_{i=1}^{C} y_i \log(p_i) \tag{2}$$

where C represents a category of the sample discrimination result; $y_i$ represents the sample discrimination result label; $p_i$ is a probability corresponding to a true label.

In an embodiment of the present disclosure, there may be three categories of sample discrimination results, and the sample discrimination result labels are I—unresolved query; II—query partially solved; III—query perfectly solved, respectively.

It should be noted that the category of sample discrimination results may be set according to the needs of actual application scenarios, which is not specifically limited in the present disclosure.

According to an embodiment of the present disclosure, the pre-trained model may include at least a feature extraction layer and a feature processing layer. When adjusting the model parameter of the pre-trained model based on the second loss value, in order to improve the training efficiency of the model, the model parameter of the feature extraction layer may be fixed first, and the model parameter of the feature processing layer may be fine-tuned. When the convergence speed of the second loss value is slow, the model parameter of the feature extraction layer and the model parameter of the feature processing layer may be adjusted in parallel to improve the convergence speed of the second loss value and shorten the model training cycle. According to an embodiment of the present disclosure, by increasing the confidence level output branch, the difficulty of the first model in discriminating the sample text pairs may be determined based on the confidence level, so that the sample text pairs with high discrimination difficulty may be selected to train the generative model.

Figure 3A:
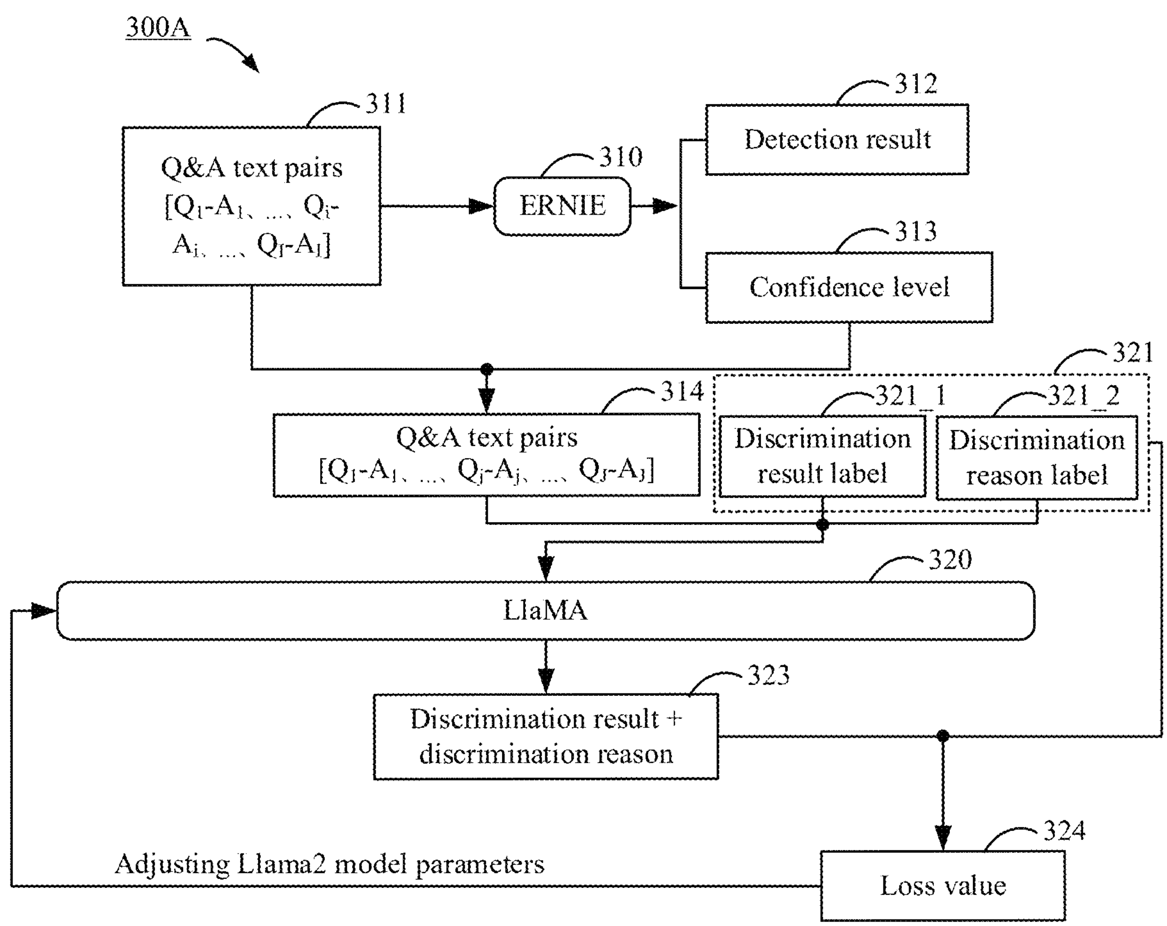
FIG. 3A schematically shows a schematic diagram of model training according to an embodiment of the present disclosure.
Figure 3B:
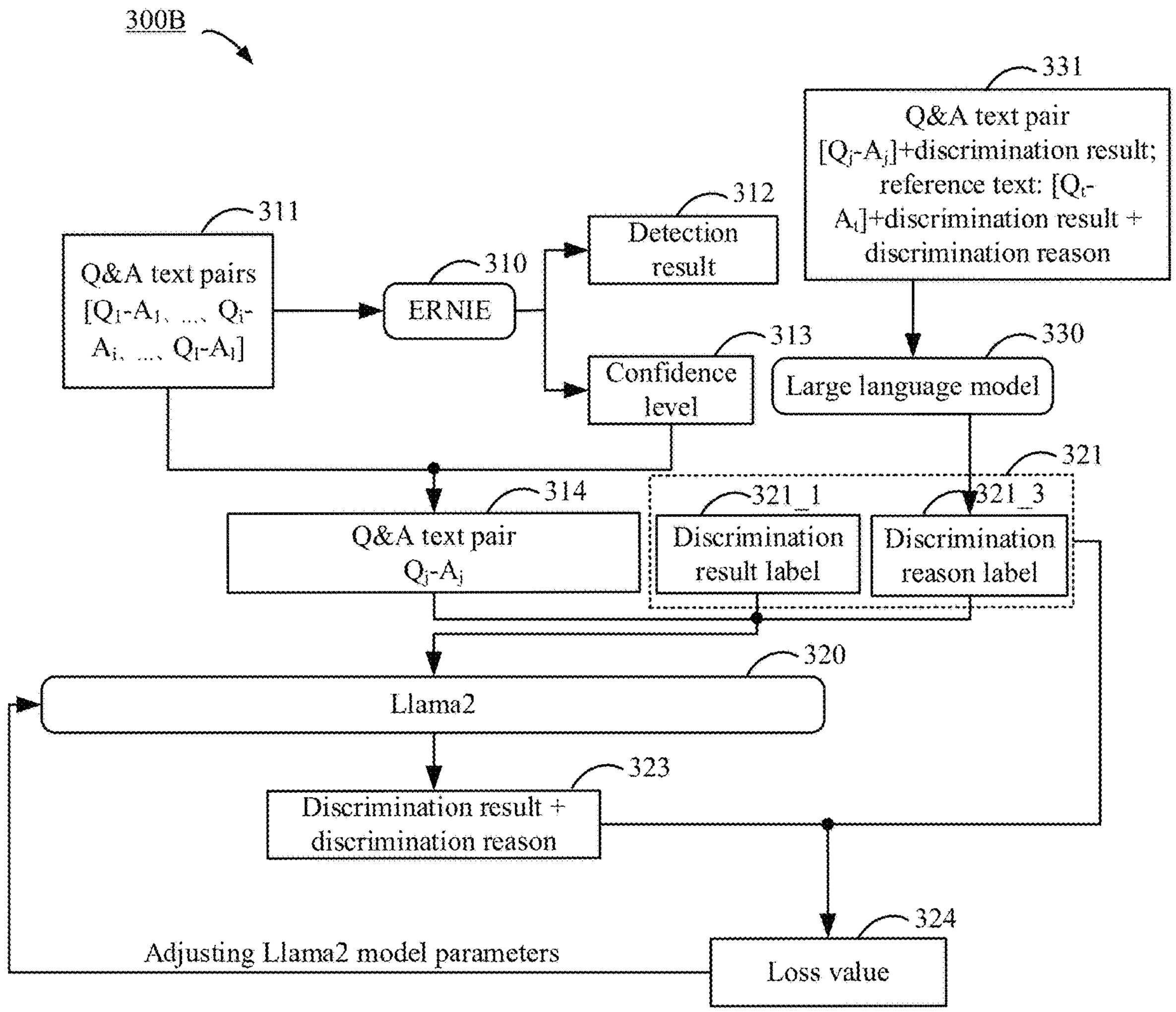
FIG. 3B schematically shows a schematic diagram of model training according to another embodiment of the present disclosure.

Referring to FIG. 3A and FIG. 3B, the method shown in FIG. 2 will be further described below in connection with specific embodiments.

FIG. 3A schematically shows a schematic diagram of model training according to an embodiment of the present disclosure.

As shown in FIG. 3A, the embodiment 300A may include ERNIE model 310 and LlaMA model 320.

First, the Q&A (Query & Answer) text pairs [$Q_1$-$A_1$ . . . $Q_i$-$A_i$ . . . $Q_I$-$A_I$] 311 are input into the ERNIE model 310, and a detection result 312 and a confidence level 313 are output. The detection result 312 and the confidence level 313 correspond to the Q&A text pair. For example, the detection result for $Q_1$-$A_1$ text pair is I (unresolved query) with a confidence level of 67%, and the detection result of $Q_1$-$A_1$ text pair is II (query partially solved) with a confidence level of 97%.

Then, based on a predetermined threshold of confidence, for example: 90%, text pairs with confidence level less than the predetermined threshold are selected as sample data for training the LlaMA model 320. Q&A text pairs [$Q_1$-$A_1$ . . . $Q_j$-$A_j$ . . . $Q_J$-$A_J$] 314 may be obtained. Since the confidence levels of the detection results corresponding to the selected Q&A text pairs are low, it means that it is difficult for the ERNIE model 310 to discriminate these text pairs, and accordingly, the accuracy of the detection results of these text pairs by the ERNIE model 310 is also low.

Next, a manually labeled label 321 and the Q&A text pairs [$Q_1$-$A_1$ . . . $Q_j$-$A_j$ . . . $Q_J$-$A_J$] 314 are jointly input into the LlaMA model 320 for training, and a discrimination result+discrimination reason 323 is generated.

According to an embodiment of the present disclosure, the processing a sample text pair and a sample label by using an initial model to obtain a second sample detection result may include the following operations: concatenating the sample text pair and the sample label to generate a sample target text; performing a tokenization on the sample target text to generate a sample word sequence; encoding each word in the sample word sequence according to an arrangement position to generate a sample feature sequence; and processing the sample feature sequence based on an attention mechanism to generate the second sample detection result.

According to an embodiment of the present disclosure, the sample target text may be a text paragraph composed of a sample text pair, a sample discrimination result label, and a sample discrimination reason label. A tokenization may be performed on the sample target text in the form of words or phrases to form a sample word sequence. After that, the sample word sequence is converted into an integer index sequence based on the index value of the word or phrase in the corpus. Next, the integer index sequence may be mapped to a real number vector and encoded based on the position of each word or phrase in the Token sequence to generate a sample feature sequence.

According to an embodiment of the present disclosure, the LlaMA model 320 is constructed based on a Transformer decoder, using an autoregressive method, i.e., generating each Token (text unit) in the output sequence one by one. Text units may be words, punctuation marks, numbers, or other language elements. During the decoding process, each time a Token is generated, the previously generated content is used as context to help predict the next Token. The generated Token sequence transforms the probability distribution of each position into the probability of the corresponding Token through an output layer, usually a linear transformation plus a Softmax function. Based on the probability, the Token with the highest probability is selected as the prediction result of the model. In the generation task, the above autoregressive generation process may be repeated to generate a plurality of Tokens until a termination marker (such as a period or end symbol) is encountered or the preset maximum output length is reached, and a second detection result including the discrimination result and the discrimination reason is output.

According to an embodiment of the present disclosure, the discrimination result label and the discrimination reason label may be concatenated to generate a label text, and a first loss value is obtained according to the label text and the second sample detection result based on the first loss function.

For example, for $Q_1$-$A_1$, the discrimination result label may be "unresolved query", and the discrimination reason may be "the answer has nothing to do with the query". "Unsolved query" and "the answer has nothing to do with the query" may be concatenated to generate a label text "unresolved query, the reason is that the answer has nothing to do with the query". The second detection result output by the LlaMA model 320 is a text including the discrimination result and the discrimination reason, thus there is no need to perform a secondary concatenating operation. For example, the second detection result may be "unresolved query, the reason is that the answer is unrelated to the query". Then, based on the formula (1) described above, the loss value 324 is calculated based on the label text and the discrimination result+discrimination reason 323.

According to an embodiment of the present disclosure, since the manually labeled label 321 includes a discrimination result label 321_1 and a discrimination reason label 321_2, during the training process of the LlaMA model 320, the LlaMA model 320 may learn not only the discrimination result but also the discrimination reason corresponding to the discrimination result based on contextual learning of the input data, such that the LlaMA model 320 has inference and discrimination capabilities for deep logical features.

In the scenario of query and answer text quality detection, the technical fields of query and answer involved are very wide, and the manually labeled discrimination reasons are limited to the knowledge reserves and subjective cognition of relevant personnel, resulting in uneven accuracy of the labeled discrimination reasons. Therefore, the LlaMA model 320 trained with manually labeled discrimination reason label has a certain accuracy bottleneck.

Generative large language models are pre-trained based on rich corpus and have strong logical reasoning capability. Therefore, the embodiments of the present disclosure may use the discrimination reason output by a generative large language model as the discrimination reason label to train the LlaMA model 320, in order to break through the accuracy bottleneck of the LlaMA model 320.

According to an embodiment of the present disclosure, a prompt text may be constructed based on the sample text pair, a first discrimination result label corresponding to the sample text pair, and a reference text. The reference text includes a text pair related to a target sample text, a second discrimination result label corresponding to the text pair, and a discrimination reason label corresponding to the text pair, and the first discrimination result label and the second discrimination result label are the same. The prompt text is processed by using a large language model to generate a second discriminant reason corresponding to the sample text pair, and the second discrimination reason is determined as a discrimination reason label.

FIG. 3B schematically shows a schematic diagram of model training according to another embodiment of the present disclosure.

As shown in FIG. 3B, in the embodiment 300B, the ERNIE model 310, the LlaMA model 320, and a large language model 330 may be included. The Q&A text pair 311 is processed by using the ERNIE model 310 to obtain the detection result 312, and the process of selecting the Q&A text pair 314 for training the LlaMA model 320 from the Q&A text pair 311 based on the confidence level 313 is the same as that in the embodiment 300A, which will not be described in details here.

Then, a prompt text 331 is constructed according to the selected Q&A text pair 314, a manually labeled discrimination result, and a reference text. The reference text may include other text pairs $Q_t$-$A_t$ in a domain similar to the Q&A text pair 314, and a manually labeled discrimination result+discrimination reason corresponding to the text pair $Q_t$-$A_t$.

For example, the text pair $Q_j$-$A_j$ may be a query and an answer about the field of autonomous driving technology, 1-3 text pairs may be randomly selected from other query and answer text pairs in the field of autonomous driving technology, and the discrimination result and the discrimination reason may be labeled for each of the 1-3 text pairs. The text pair $Q_j$-$A_j$, the manually labeled discrimination result corresponding to the text pair $Q_j$-$A_j$, the 1-3 text pairs described above, and the discrimination result and the discrimination reason corresponding to the 1-3 text pairs described above are combined to form a Prompt (prompt text).

It should be noted that the type of the discrimination result label of the 1-3 text pairs is the same as the type of the discrimination result label of the text pair $Q_j$-$A_j$. For example, if the discrimination result label of the text pair $Q_j$-$A_j$ is "I-unresolved query", then the discrimination result label type of the 1-3 text pairs is also "I-unresolved query", so that the generative model may output the reason label matched with the discrimination result by referring to the discrimination reason of the 1-3 text pairs.

Next, the prompt text 331 is input into the large language model 330, the discrimination reason corresponding to the text pair $Q_j$-$A_j$ is output, and the discrimination reason is determined as the discrimination reason label 321_3. The LlaMA model 320 is trained by using the discrimination reason label 321_3 in combination with the manually labeled discrimination result labels. The training process is the same as that in the embodiment 300A described above, which will not be described in details here.

According to an embodiment of the present disclosure, the discrimination results and the discrimination reasons of other text pairs in the related field of the text pair are taken as reference texts to be input into the large model together, and the discrimination reason label for training the LlaMA model 320 is output. By fully utilizing the rich corpus and logical reasoning capacity of the generative large model, the logical reasoning capacity of the generative large model is learned by the LlaMA model 320 in a way similar to result distillation. The model accuracy may be improved, and meanwhile the requirement of the model on hardware resources is reduced, such that the LlamA model 320 may efficiently complete the quality detection task of the text pair under the condition of limited hardware resources.

In the scenario of quality inspection for the query and answer text pair, not only the accuracy requirement of the detection result need to be met, but also the hardware resource requirements for model operation need to be considered. Therefore, the embodiments of the present disclosure provide a method of detecting a text that combines a discriminative model and a generative model.

Figure 4:
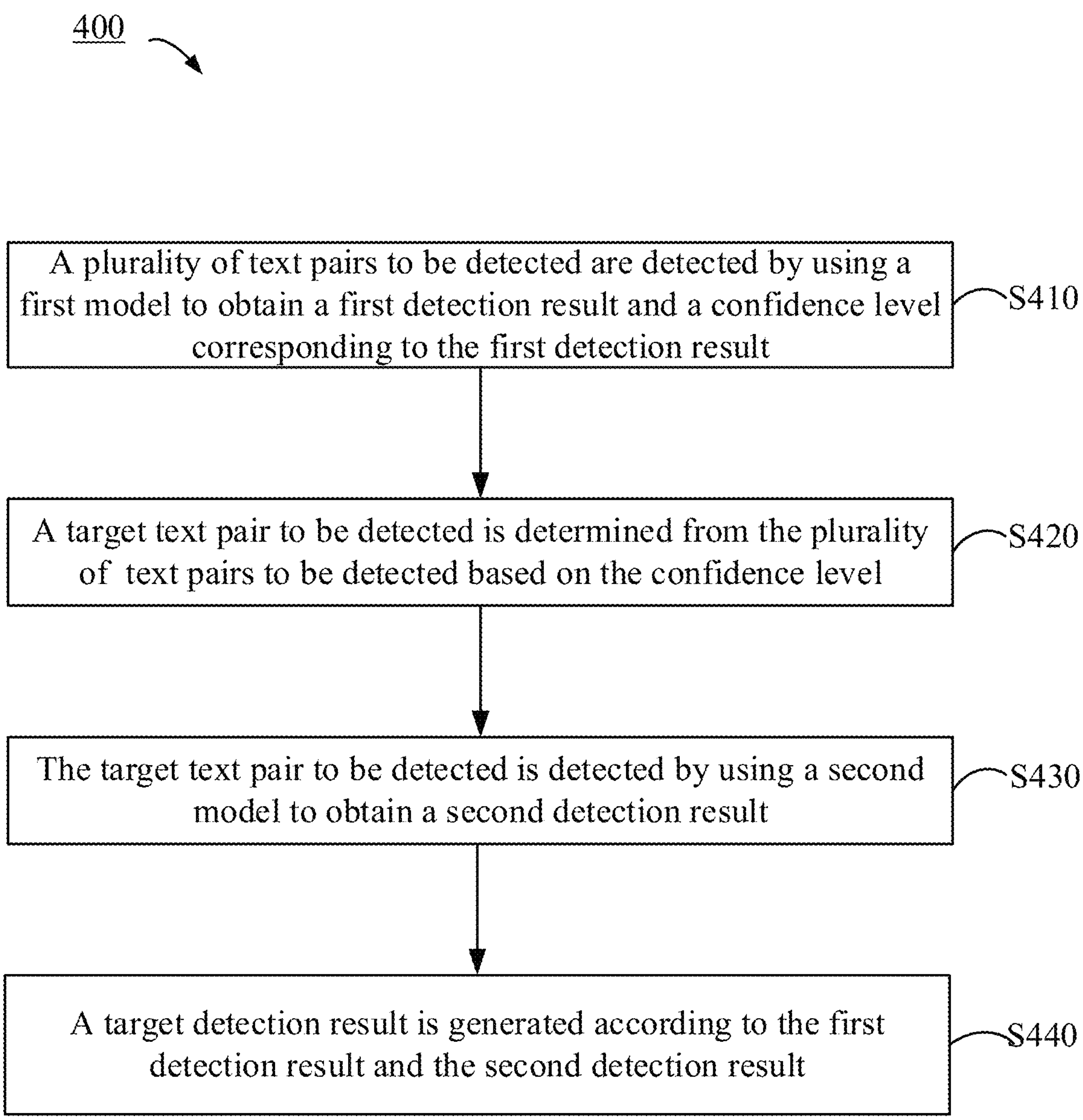
FIG. 4 schematically shows a flowchart of a method of detecting a text according to an embodiment of the present disclosure.

FIG. 4 schematically shows a flowchart of a method according to an embodiment of the present disclosure.

As shown in FIG. 4, the method 400 of detecting a text includes operation S410 to operation S440.

In operation S410, a plurality of text pairs to be detected are detected by using a first model to obtain a first detection result and a confidence level corresponding to the first detection result.

In operation S420, a target text pair to be detected is determined from the plurality of text pairs to be detected based on the confidence level.

In operation S430, the target text pair to be detected is detected by using a second model to obtain a second detection result.

In operation S440, a target detection result is generated according to the first detection result and the second detection result.

According to an embodiment of the present disclosure, the first model may be a discriminative model, such as the ERNIE model. The second model may be the target model trained by using the method of training a model described above, such as the LlaMA model.

According to an embodiment of the present disclosure, the plurality of text pairs to be detected include a plurality of query texts and a plurality of answer texts corresponding to the plurality of query texts.

According to an embodiment of the present disclosure, all text pairs to be detected may be detected by using the first model, so that the first detection result of each text pair and the confidence level corresponding to the first detection result may be obtained. For example, the first detection result of the text pair $Q_1$-$A_1$ is II (query partially solved), with a confidence level of 95%. The first detection result of the text pair $Q_2$-$A_2$ is II (query partially solved), with a confidence level of 55%.

According to an embodiment of the present disclosure, the predetermined threshold of the confidence level may be set to 80%. Since the confidence level of the first detection result of the text pair $Q_1$-$A_1$ is greater than 80%, the first detection result of the text pair $Q_1$-$A_1$ may be used as a final detection result. However, the confidence level of the first detection result of the text pair $Q_2$-$A_2$ is less than 80%, thus the text pair $Q_2$-$A_2$ may be determined as the target text pair as the input data of the second model. The amount of data processing of the second model may be reduced, and the detection efficiency may be improved.

According to an embodiment of the present disclosure, the target text pair may be detected by using the second model, and the second detection result obtained includes not only the discrimination result category of the text pair, but also the discrimination reason corresponding to the discrimination result category.

For example, the second model is used to process the text pair $Q_2$-$A_2$, the second detection result obtained may be [I (unresolved query) the reason is that the answer $A_2$ is not related to the query $Q_2$].

Finally, the first detection result with confidence level greater than the predetermined threshold output by the first model and the second detection result output by the second model are combined as the target detection result. The target detection result characterizes a response matching degree between an answer text and a corresponding query text.

According to an embodiment of the present disclosure, by comprehensively utilizing the discriminative model and the generative model, compared with the single discriminative model in the related example, the problem that the detection accuracy of the discriminative model is low due to data overfitting may be solved, and the robustness of the model may be improved, and the generative model may be used to detect only the text pairs with low confidence level under the condition of limited hardware resources, thereby reducing the data processing amount of the generative model and improving the detection efficiency.

Figure 5:
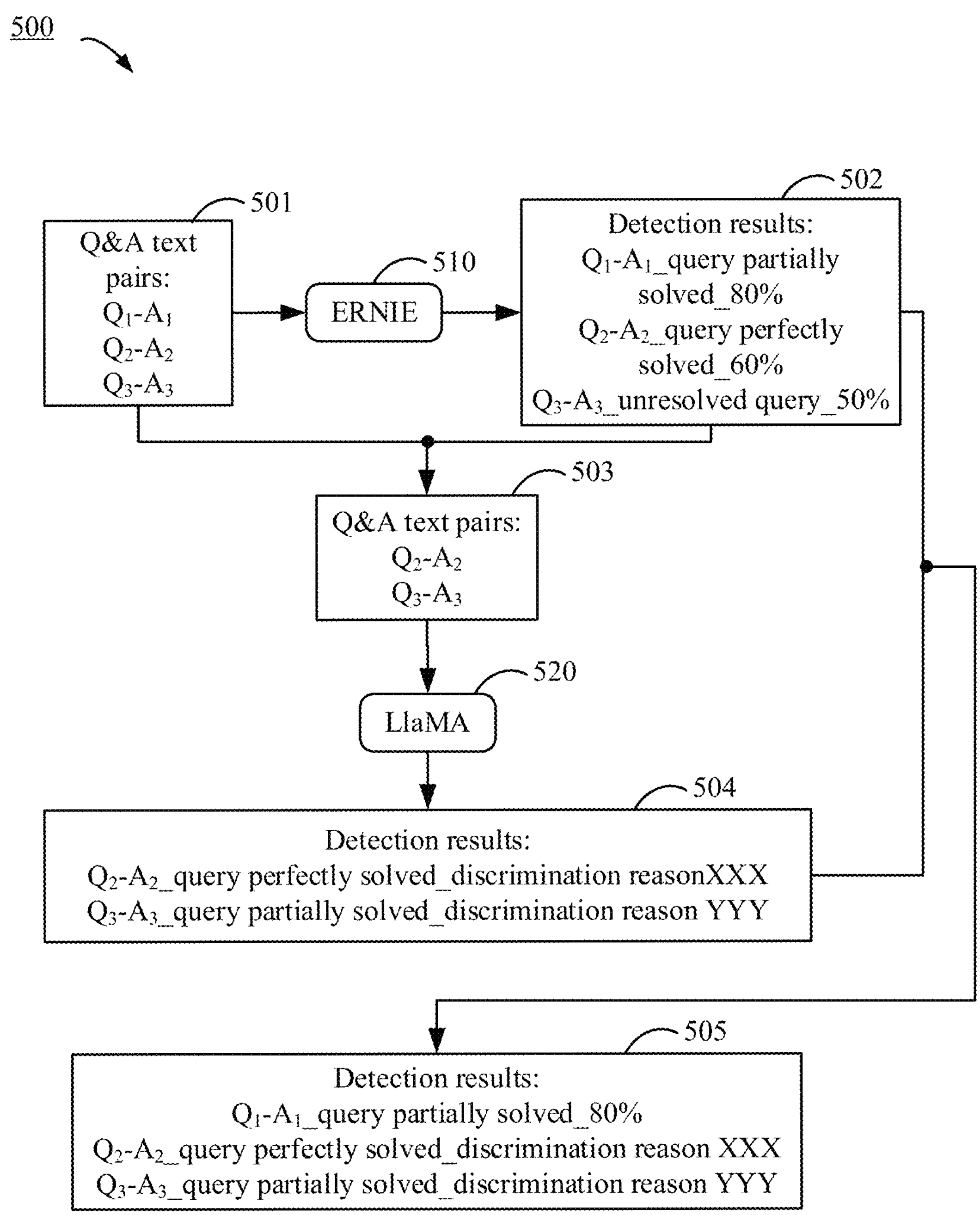
FIG. 5 schematically shows a schematic diagram of text detection according to an embodiment of the present disclosure.

FIG. 5 schematically shows a schematic diagram of text detection according to an embodiment of the present disclosure.

As shown in FIG. 5, in embodiment 500, ERNIE model 510 and LlaMA model 520 may be included.

First, the Q&A text pairs 501 "$Q_1$-$A_1$, $Q_2$-$A_2$, $Q_3$-$A_3$" are input into the ERNIE model 510, and the detection results 502 "$Q_1$-$A_1$_query partially solved_80%; $Q_2$-$A_2$_query perfectly solved_60%; $Q_3$-$A_3$_unresolved query_50%" are output. Based on the confidence level, Q&A text pairs 503 "$Q_2$-$A_2$, $Q_3$-$A_3$" are selected from the Q&A text pairs 501.

Then, the Q&A text pairs 503 "$Q_2$-$A_2$, $Q_3$-$A_3$" are input into the LlaMA model 520, and the detection results 504 "$Q_2$-$A_2$_query perfectly solved_discrimination reason XXX; $Q_3$-$A_3$_query partially solved_discrimination reason YYY" are output.

For example, a tokenization may be performed on a target text to be detected "$Q_2$-$A_2$" to generate a word sequence. Then, the sample word sequence is converted into an integer index sequence based on the index value of the word or phrase in the corpus. Next, the integer index sequence may be mapped to a real number vector and encoded based on the position of each word or phrase in the Token sequence to generate a feature sequence. Next, each Token (text unit) in the output sequence is generated one by one based on the attention mechanism by using an autoregressive method. Text units may be words, punctuation marks, numbers, or other language elements. During the decoding process, each time a Token is generated, the previously generated content is used as context to help predict the next Token. The generated Token sequence transforms the probability distribution of each position into the probability of the corresponding Token through an output layer, usually a linear transformation plus a Softmax function. Based on the probability, the Token with the highest probability is selected as the prediction result of the model. In the generation task, the above autoregressive generation process may be repeated to generate a plurality of Tokens until a termination marker (such as a period or end symbol) is encountered or the preset maximum output length is reached. The output second detection result may be "$Q_2$-$A_2$_query perfectly solved_discrimination reason XXX".

Finally, the results with the confidence level greater than the predetermined threshold in the detection results 502 are combined with the detection results 504 to obtain detection results 505 "$Q_1$-$A_1$_query partially solved_80%; $Q_2$-$A_2$_query perfectly solved_discrimination reason XXX; $Q_3$-$A_3$_query partially solved_discrimination reason YYY".

Figure 6:
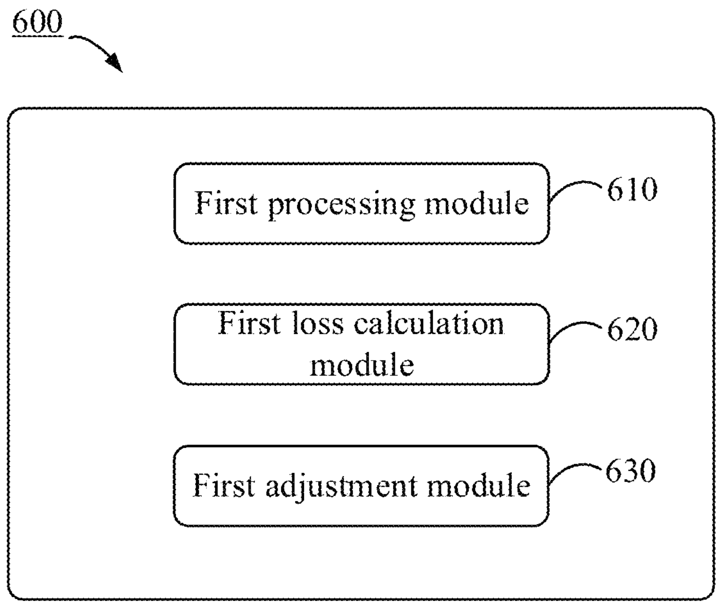
FIG. 6 schematically shows a block diagram of an apparatus of training a model according to an embodiment of the present disclosure.

FIG. 6 schematically shows a block diagram of an apparatus of training a model according to an embodiment of the present disclosure.

As shown in FIG. 6, an apparatus 600 of training a model may include a first processing module 610, a first loss calculation module 620, and a first adjustment module 630.

The first processing module 610 is configured to, in response to a confidence level of a first sample detection result being less than a predetermined threshold, process a sample text pair and a sample label by using an initial model to obtain a second sample detection result, where the confidence level of the first sample detection result is obtained by detecting the sample text pair using a first model, the sample text pair includes a sample query text and a sample answer text corresponding to the sample query text, the second sample detection result includes a discrimination result configured to characterize a response matching degree between the sample answer text and the sample query text, and a discrimination reason corresponding to the discrimination result, the sample label includes a discrimination result label and a discrimination reason label, and a type of the initial model is different from a type of the first model.

The first loss calculation module 620 is configured to obtain a first loss value according to the second sample detection result and the sample label based on a first loss function.

The first adjustment module 630 is configured to adjust a model parameter of the initial model based on the first loss value to obtain a trained target model.

According to an embodiment of the present disclosure, the first loss calculation module may include: a first concatenating submodule configured to concatenate the discrimination result label and the discrimination reason label to generate a label text; and a calculation submodule configured to obtain the first loss value according to the label text and the second sample detection result based on the first loss function.

According to an embodiment of the present disclosure, the first processing module may include: a first concatenating submodule, a first tokenization submodule, a first encoding submodule, and a first processing submodule.

The first concatenating submodule is configured to concatenate the sample text pair and the sample label to generate a sample target text. The first tokenization submodule is configured to perform a tokenization on the sample target text to generate a sample word sequence. The first encoding submodule is configured to encode each word in the sample word sequence according to an arrangement position to generate a sample feature sequence. The first processing submodule is configured to process the sample feature sequence based on an attention mechanism to generate the second sample detection result.

According to an embodiment of the present disclosure, the training apparatus described above further includes: a construction module, a second processing module, and a first determination module.

The construction module is configured to construct a prompt text based on the sample text pair, a first discrimination result label corresponding to the sample text pair, and a reference text, wherein the reference text includes a text pair related to a target sample text, a second discrimination result label corresponding to the text pair, and a discrimination reason label corresponding to the text pair, and the first discrimination result label and the second discrimination result label are the same.

The second processing module is configured to process the prompt text by using a large language model to generate a second discriminant reason corresponding to the sample text pair.

The first determination module is configured to determine the second discrimination reason as a discrimination reason label.

According to an embodiment of the present disclosure, the training apparatus described above further includes: a first detection module configured to detect the sample text pair by using a pre-trained model to generate a sample detection result and a confidence level of the sample detection result; a second loss calculation module configured to obtain a second loss value according to the sample detection result and a sample discrimination result label based on a second loss function; and a second adjustment module configured to adjust a model parameter of the pre-trained model based on the second loss value to obtain the first model.

Figure 7:
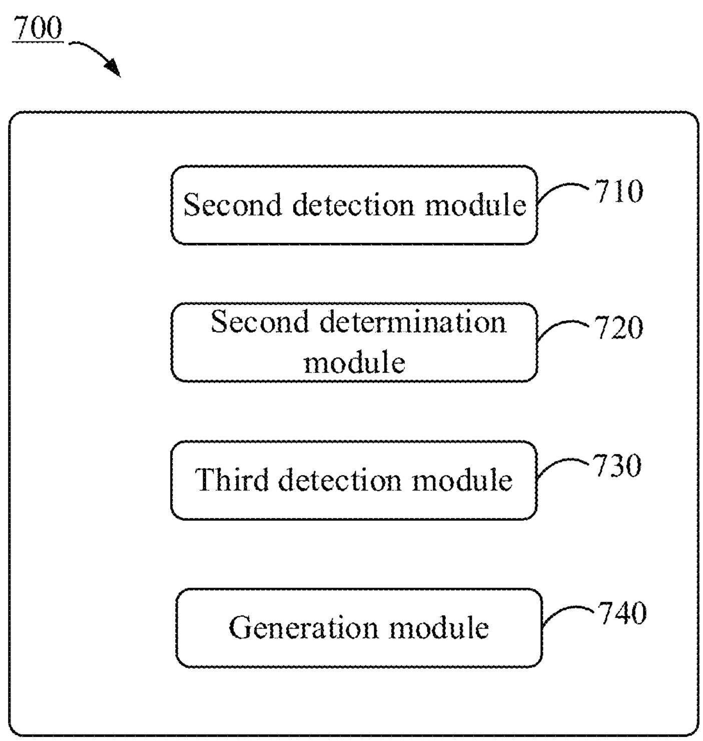
FIG. 7 schematically shows a block diagram of an apparatus of detecting a text according to an embodiment of the present disclosure.

FIG. 7 schematically shows a block diagram of an apparatus of detecting a text according to an embodiment of the present disclosure.

As shown in FIG. 7, the apparatus 700 of detecting a text may include: a second detection module 710, a second determination module 720, a third detection module 730, and a generation module 740.

The second detection module 710 is configured to detect a plurality of text pairs to be detected by using a first model to obtain a first detection result and a confidence level corresponding to the first detection result, wherein the first model is a discriminative model, and the plurality of text pairs to be detected include a plurality of query texts and a plurality of answer texts corresponding to the plurality of query texts.

The second determination module 720 is configured to determine a target text pair to be detected from the plurality of text pairs to be detected based on the confidence level, wherein a confidence level of a detection result corresponding to the target text pair to be detected is less than a predetermined threshold.

The third detection module 730 is configured to detect the target text pair to be detected by using a second model to obtain a second detection result, wherein the second model is a trained target model obtained by the training method described above.

The generation module 740 is configured to generate a target detection result according to the first detection result and the second detection result, wherein the target detection result characterizes a response matching degree between an answer text and a corresponding query text.

According to an embodiment of the present disclosure, the third detection module may include: a second tokenization submodule, a second encoding submodule, and a second processing submodule.

The second tokenization submodule is configured to perform tokenization on a target text to be detected to generate a word sequence. The second encoding submodule is configured to encode each word in the word sequence according to an arrangement position to generate a feature sequence. The second processing submodule is configured to process the feature sequence based on an attention mechanism to generate the second detection result.

According to an embodiment of the present disclosure, the present disclosure further provides an electronic device, a readable storage medium and a computer program product.

According to an embodiment of the present disclosure, an electronic device includes: at least one processor; and a memory communicatively connected to the at least one processor, wherein the memory stores instructions executable by the at least one processor, and the instructions, when executed by the at least one processor, cause the at least one processor to implement the method described above.

According to an embodiment of the present disclosure, a non-transitory computer readable storage medium having computer instructions stored therein, wherein the computer instructions are configured to cause a computer to implement the method described above.

According to an embodiment of the present disclosure, a computer program product includes a computer program, wherein the computer program, when executed by a processor, implements the method described above.

Figure 8:
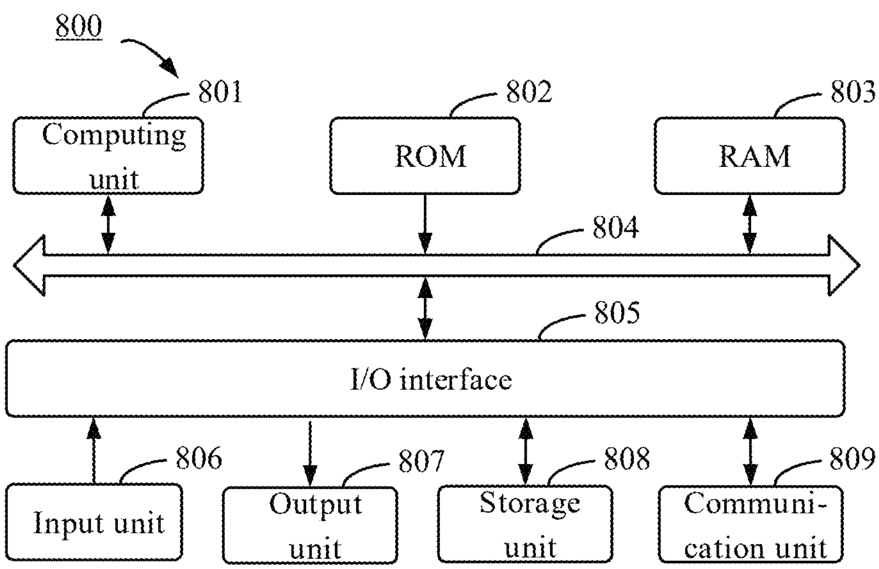
FIG. 8 schematically shows a block diagram of an electronic device adapted to implement a method of training a model or a method of detecting a text according to an embodiment of the present disclosure.

FIG. 8 shows a schematic block diagram of an exemplary electronic device 800 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the device 800 may also be stored. The computing unit 801, the ROM 802 and the RAM 803 are connected to each other through a bus 804. $A_n$ input/output (I/O) interface 805 is also connected to the bus 804.

A plurality of components in the device 800 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the device 800 to exchange information/data with other devices through a computer network such as Internet and/or various telecommunication networks.

The computing unit 801 may be various general-purpose and/or dedicated processing assemblies having processing and computing capabilities. Some examples of the computing units 801 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 801 executes various methods and processes described above, such as the method of training a model or the method of detecting a text. For example, in some embodiments, the method of training a model or the method of detecting a text may be implemented as a computer software program which is tangibly embodied in a machine-readable medium, such as the storage unit 808. In some embodiments, the computer program may be partially or entirely loaded and/or installed in the device 800 via the ROM 802 and/or the communication unit 809. The computer program, when loaded in the RAM 803 and executed by the computing unit 801, may execute one or more steps in the method of training a model or the method of detecting a text described above. Alternatively, in other embodiments, the computing unit 801 may be configured to perform the method of training a model or the method of detecting a text by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the method of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the object, the systems and technologies described here may be implemented on a computer including a display device (for example, a CRT (cathode ray tube) or LCD (liquid crystal display) monitor) for displaying information to the object, and a keyboard and a pointing device (for example, a mouse or a trackball) through which the object may provide the input to the computer. Other types of devices may also be used to provide interaction with the object. For example, a feedback provided to the object may be any form of sensory feedback (for example, visual feedback, auditory feedback, or tactile feedback), and the input from the object may be received in any form (including acoustic input, voice input or tactile input).

The systems and technologies described herein may be implemented in a computing system including back-end components (for example, a data server), or a computing system including middleware components (for example, an application server), or a computing system including front-end components (for example, an object computer having a graphical object interface or web browser through which the object may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server that combines a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a model, the method comprising:

processing, in response to a confidence level of a first sample detection result being less than a predetermined threshold, a sample text pair and a sample label by using an initial model to obtain a second sample detection result, wherein the confidence level of the first sample detection result is obtained by detecting the sample text pair using a first model, the sample text pair comprises a sample query text and a sample answer text corresponding to the sample query text, the second sample detection result comprises a discrimination result configured to characterize a response matching degree between the sample answer text and the sample query text, and a discrimination reason corresponding to the discrimination result, the sample label comprises a discrimination result label and a discrimination reason label, and a type of the initial model is different from a type of the first model;

obtaining a first loss value according to the second sample detection result and the sample label based on a first loss function; and adjusting a model parameter of the initial model based on the first loss value to obtain a trained target model.

2. The method according to claim 1, wherein the obtaining a first loss value according to the second sample detection result and the sample label based on a first loss function comprises:

concatenating the discrimination result label and the discrimination reason label to generate a label text; and obtaining the first loss value according to the label text and the second sample detection result based on the first loss function.

3. The method according to claim 1, wherein the processing a sample text pair and a sample label by using an initial model to obtain a second sample detection result comprises:

concatenating the sample text pair and the sample label to generate a sample target text;

performing a tokenization on the sample target text to generate a sample word sequence;

encoding each word in the sample word sequence according to an arrangement position to generate a sample feature sequence; and processing the sample feature sequence based on an attention mechanism to generate the second sample detection result.

4. The method according to claim 1, further comprising:

constructing a prompt text based on the sample text pair, a first discrimination result label corresponding to the sample text pair, and a reference text, wherein the reference text comprises a text pair related to a target sample text, a second discrimination result label corresponding to the text pair, and a discrimination reason label corresponding to the text pair, and the first discrimination result label and the second discrimination result label are the same;

processing the prompt text by using a large language model to generate a second discriminant reason corresponding to the sample text pair; and determining the second discrimination reason as a discrimination reason label.

5. The method according to claim 2, further comprising:

constructing a prompt text based on the sample text pair, a first discrimination result label corresponding to the sample text pair, and a reference text, wherein the reference text comprises a text pair related to a target sample text, a second discrimination result label corresponding to the text pair, and a discrimination reason label corresponding to the text pair, and the first discrimination result label and the second discrimination result label are the same;

processing the prompt text by using a large language model to generate a second discriminant reason corresponding to the sample text pair; and determining the second discrimination reason as a discrimination reason label.

6. The method according to claim 3, further comprising:

constructing a prompt text based on the sample text pair, a first discrimination result label corresponding to the sample text pair, and a reference text, wherein the reference text comprises a text pair related to a target sample text, a second discrimination result label corresponding to the text pair, and a discrimination reason label corresponding to the text pair, and the first discrimination result label and the second discrimination result label are the same;

processing the prompt text by using a large language model to generate a second discriminant reason corresponding to the sample text pair; and determining the second discrimination reason as a discrimination reason label.

7. The method according to claim 1, further comprising:

detecting the sample text pair by using a pre-trained model to generate a sample detection result and a confidence level of the sample detection result;

obtaining a second loss value according to the sample detection result and a sample discrimination result label based on a second loss function; and adjusting a model parameter of the pre-trained model based on the second loss value to obtain the first model.

8. The method according to claim 2, further comprising:

detecting the sample text pair by using a pre-trained model to generate a sample detection result and a confidence level of the sample detection result;

obtaining a second loss value according to the sample detection result and a sample discrimination result label based on a second loss function; and adjusting a model parameter of the pre-trained model based on the second loss value to obtain the first model.

9. The method according to claim 3, further comprising:

detecting the sample text pair by using a pre-trained model to generate a sample detection result and a confidence level of the sample detection result;

obtaining a second loss value according to the sample detection result and a sample discrimination result label based on a second loss function; and adjusting a model parameter of the pre-trained model based on the second loss value to obtain the first model.

10. A method of detecting a text, the method comprising:

detecting a plurality of text pairs to be detected by using a first model to obtain a first detection result and a confidence level corresponding to the first detection result, wherein the first model is a discriminative model, and the plurality of text pairs to be detected comprise a plurality of query texts and a plurality of answer texts corresponding to the plurality of query texts;

determining a target text pair to be detected from the plurality of text pairs to be detected based on the confidence level, wherein a confidence level of a detection result corresponding to the target text pair to be detected is less than a predetermined threshold;

detecting the target text pair to be detected by using a second model to obtain a second detection result, wherein the second model is a trained target model obtained by the method according to claim 1; and generating a target detection result according to the first detection result and the second detection result, wherein the target detection result characterizes a response matching degree between an answer text and a corresponding query text.

11. The method according to claim 10, wherein the detecting the target text pair to be detected by using a second model to obtain a second detection result comprises:

performing a tokenization on a target text to be detected to generate a word sequence;

encoding each word in the word sequence according to an arrangement position to generate a feature sequence; and processing the feature sequence based on an attention mechanism to generate the second detection result.

12. A method of detecting a text, the method comprising:

detecting a plurality of text pairs to be detected by using a first model to obtain a first detection result and a confidence level corresponding to the first detection result, wherein the first model is a discriminative model, and the plurality of text pairs to be detected comprise a plurality of query texts and a plurality of answer texts corresponding to the plurality of query texts;

determining a target text pair to be detected from the plurality of text pairs to be detected based on the confidence level, wherein a confidence level of a detection result corresponding to the target text pair to be detected is less than a predetermined threshold;

detecting the target text pair to be detected by using a second model to obtain a second detection result, wherein the second model is a trained target model obtained by the method according to claim 2; and generating a target detection result according to the first detection result and the second detection result, wherein the target detection result characterizes a response matching degree between an answer text and a corresponding query text.

13. The method according to claim 12, wherein the detecting the target text pair to be detected by using a second model to obtain a second detection result comprises:

performing a tokenization on a target text to be detected to generate a word sequence;

encoding each word in the word sequence according to an arrangement position to generate a feature sequence; and processing the feature sequence based on an attention mechanism to generate the second detection result.

14. A method of detecting a text, the method comprising:

detecting a plurality of text pairs to be detected by using a first model to obtain a first detection result and a confidence level corresponding to the first detection result, wherein the first model is a discriminative model, and the plurality of text pairs to be detected comprise a plurality of query texts and a plurality of answer texts corresponding to the plurality of query texts;

determining a target text pair to be detected from the plurality of text pairs to be detected based on the confidence level, wherein a confidence level of a detection result corresponding to the target text pair to be detected is less than a predetermined threshold;

detecting the target text pair to be detected by using a second model to obtain a second detection result, wherein the second model is a trained target model obtained by the method according to claim 3; and generating a target detection result according to the first detection result and the second detection result, wherein the target detection result characterizes a response matching degree between an answer text and a corresponding query text.

15. The method according to claim 14, wherein the detecting the target text pair to be detected by using a second model to obtain a second detection result comprises:

performing a tokenization on a target text to be detected to generate a word sequence;

encoding each word in the word sequence according to an arrangement position to generate a feature sequence; and processing the feature sequence based on an attention mechanism to generate the second detection result.

16. A method of detecting a text, the method comprising:

detecting a plurality of text pairs to be detected by using a first model to obtain a first detection result and a confidence level corresponding to the first detection result, wherein the first model is a discriminative model, and the plurality of text pairs to be detected comprise a plurality of query texts and a plurality of answer texts corresponding to the plurality of query texts;

determining a target text pair to be detected from the plurality of text pairs to be detected based on the confidence level, wherein a confidence level of a detection result corresponding to the target text pair to be detected is less than a predetermined threshold;

detecting the target text pair to be detected by using a second model to obtain a second detection result, wherein the second model is a trained target model obtained by the method according to claim 4; and generating a target detection result according to the first detection result and the second detection result, wherein the target detection result characterizes a response matching degree between an answer text and a corresponding query text.

17. An electronic device, comprising:

at least one processor; and a memory communicatively connected to the at least one processor, wherein the memory stores instructions executable by the at least one processor, and the instructions, when executed by the at least one processor, are configured to cause the at least one processor to implement at least the method according to claim 1.

18. An electronic device, comprising:

at least one processor; and a memory communicatively connected to the at least one processor, wherein the memory stores instructions executable by the at least one processor, and the instructions, when executed by the at least one processor, are configured to cause the at least one processor to implement at least the method according to claim 10.

19. A non-transitory computer readable storage medium having computer instructions stored therein, wherein the computer instructions are configured to cause a computer system to implement at least the method according to claim 1.

20. A non-transitory computer readable storage medium having computer instructions stored therein, wherein the computer instructions are configured to cause a computer system to implement at least the method according to claim 10.

* * * * *